(12) United States Patent
Krabot et al.

(10) Patent No.: US 10,525,975 B2
(45) Date of Patent: Jan. 7, 2020

(54) METHOD AND DEVICE FOR REGULATING THE SPEED OF A VEHICLE

(71) Applicant: KNORR-BREMSE SYSTEME FUER NUTZFAHRZEUGE GMBH, Munich (DE)

(72) Inventors: Mátyás Krabot, Szigetszentmiklós (HU); Simon Felipe Duque Velez, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 9 days.

(21) Appl. No.: 15/569,251

(22) PCT Filed: Apr. 29, 2016

(86) PCT No.: PCT/EP2016/000695
§ 371 (c)(1),
(2) Date: Oct. 25, 2017

(87) PCT Pub. No.: WO2016/173717
PCT Pub. Date: Nov. 3, 2016

(65) Prior Publication Data
US 2018/0126989 A1    May 10, 2018

(30) Foreign Application Priority Data
Apr. 29, 2015 (DE) .................. 10 2015 106 575

(51) Int. Cl.
*B60W 30/16* (2012.01)
*B60W 30/14* (2006.01)
(Continued)

(52) U.S. Cl.
CPC ........ *B60W 30/162* (2013.01); *B60W 30/143* (2013.01); *B60W 30/16* (2013.01);
(Continued)

(58) Field of Classification Search
USPC .......................................................... 701/93
See application file for complete search history.

(56) References Cited

U.S. PATENT DOCUMENTS

| 6,204,778 B1 * | 3/2001 | Bergan ................. G08G 1/075 340/905 |
| 6,226,389 B1 * | 5/2001 | Lemelson ............. G01S 13/931 382/104 |

(Continued)

FOREIGN PATENT DOCUMENTS

| CN | 1521041 A | 8/2004 |
| CN | 101263026 A | 9/2008 |

(Continued)

OTHER PUBLICATIONS

International Search Report dated Jul. 21, 2016, of the corresponding International Application PCT/EP2016/000695 filed Apr. 29, 2016.

*Primary Examiner* — Jean Paul Cass
(74) *Attorney, Agent, or Firm* — Gerard A. Messina

(57) ABSTRACT

A method for regulating a speed of a vehicle, in which a cruise control unit is provided to set a speed and a sensor system, which is directed in a direction of travel, is provided to detect an environment by spatially resolving electromagnetic radiation, the method including: defining a specified speed; setting a safety speed that is reduced with respect to the specified speed by the cruise control unit; detecting a lane change of the vehicle by the sensor system; detecting an exit ramp within a predicted travel path of the vehicle using the sensor system; and limiting the speed that is settable by the cruise control unit to a value below the specified speed. Also described is a related device and vehicle having such a device.

12 Claims, 1 Drawing Sheet

(51) Int. Cl.
*B60W 30/18* (2012.01)
*B60W 40/04* (2006.01)

(52) U.S. Cl.
CPC .............. *B60W 30/18145* (2013.01); *B60W 30/18154* (2013.01); *B60W 30/18163* (2013.01); *B60W 40/04* (2013.01); *B60K 2310/244* (2013.01); *B60W 2420/42* (2013.01); *B60W 2420/52* (2013.01); *B60W 2550/10* (2013.01); *B60W 2550/141* (2013.01); *B60W 2720/10* (2013.01); *B60W 2750/308* (2013.01)

(56) References Cited

U.S. PATENT DOCUMENTS

| | | | | |
|---|---|---|---|---|
| 7,633,411 | B2 * | 12/2009 | Bitar | G01C 23/00 340/947 |
| 7,783,426 | B2 * | 8/2010 | Kato | B60W 40/04 180/167 |
| 8,483,895 | B1 * | 7/2013 | Beregi | B61B 1/00 246/182 C |
| 8,983,679 | B2 * | 3/2015 | Kitahama | G01C 21/34 701/1 |
| 9,070,293 | B2 * | 6/2015 | Roeber | G08G 1/0967 |
| 9,234,960 | B1 * | 1/2016 | McIntosh | G01S 5/18 |
| 10,019,904 | B1 * | 7/2018 | Chan | G08G 1/205 |
| 2003/0014094 | A1 * | 1/2003 | Hammack | A61F 7/12 607/105 |
| 2003/0204299 | A1 * | 10/2003 | Waldis | B60K 31/0008 701/96 |
| 2005/0251335 | A1 * | 11/2005 | Ibrahim | B60W 50/14 701/469 |
| 2006/0177270 | A1 * | 8/2006 | Rastegar | B64F 1/02 404/71 |
| 2008/0059015 | A1 * | 3/2008 | Whittaker | G05D 1/0274 701/23 |
| 2009/0292468 | A1 * | 11/2009 | Wu | G01S 13/726 701/301 |
| 2010/0228419 | A1 * | 9/2010 | Lee | B60W 30/0953 701/25 |
| 2015/0066346 | A1 * | 3/2015 | Cheatham, III | G08G 1/166 701/301 |
| 2016/0347324 | A1 * | 12/2016 | Yoshitomi | B60W 40/04 |
| 2017/0074663 | A1 * | 3/2017 | Giurgiu | G01C 21/20 |
| 2017/0305571 | A1 * | 10/2017 | Constans | B64D 43/00 |
| 2017/0322033 | A1 * | 11/2017 | Wu | G01S 17/89 |
| 2018/0022358 | A1 * | 1/2018 | Fung | B60W 40/08 701/36 |
| 2018/0025643 | A1 * | 1/2018 | Yamamoto | B60W 50/14 701/23 |
| 2018/0126989 | A1 * | 5/2018 | Krabot | B60W 30/143 |

FOREIGN PATENT DOCUMENTS

| | | |
|---|---|---|
| CN | 101620789 A | 1/2010 |
| CN | 102198832 A | 9/2011 |
| DE | 102004060432 A1 | 8/2006 |
| DE | 2005045386 A1 | 3/2007 |
| DE | 202007018990 A1 | 12/2007 |
| DE | 102008029124 A1 | 1/2009 |
| DE | 102012213933 A1 | 2/2014 |
| WO | 2011/157251 A1 | 12/2011 |

* cited by examiner

METHOD AND DEVICE FOR REGULATING THE SPEED OF A VEHICLE

FIELD OF THE INVENTION

The present invention relates to a method and to a device for regulating the speed of a vehicle, comprising a cruise control unit for controlling the speed and a sensor system based on electromagnetic radiation to detect the environment.

BACKGROUND INFORMATION

The sensor system is here primarily used for the analysis of the travel path of the vehicle, for example in order to detect obstacles along the travel path, lane changes and properties of the road. The initial situation of the method is based on the steps of defining a specified speed by way of the driver and setting a safety speed that is reduced with respect to the specified speed by way of the cruise control unit, for example on the basis of a vehicle in front, and detecting lane change of the vehicle.

The field of application of the invention extends in particular to motor vehicles intended for long-distance traffic that comprise a cruise control unit for regulating the speed and a sensor system for perceiving the environment for the purposes of dynamic or adaptive adjustment of the speed regulation. The specified speed is here generally defined by the driver. A lane change is determined for example by optically capturing the lane using a camera and detecting the lane marking by targeted image analysis.

A typical situation when operating such a vehicle is that a radar is used to detect an obstacle vehicle in front and an adaptive cruise control unit is used to match the speed to the obstacle vehicle in front such that the vehicle drives with a safety speed that is reduced with respect to the predefined specified speed. If the obstacle vehicle in front then disappears as an obstacle, the adaptive cruise control unit once again sets the specified speed. The obstacle vehicle can disappear for example because it accelerates, turns off or because the following vehicle turns off, changes lane and/or overtakes the obstacle vehicle.

In particular, the following vehicle can change to a lane that leads to an off-ramp or exit ramp from the respective freeway or highway, that is to say for example an autobahn or two-way expressway. On such exit ramps, the speed of the vehicle must be lowered below the specified speed that is typical for the highway. For this reason, the adaptive cruise control unit may disadvantageously re-accelerate the vehicle initially for a short time here, because no obstacle is present anymore, while the vehicle shortly thereafter, at the latest in a bend of the exit ramp, must be braked again by a further driver assistance system or by the driver. This means first, that fuel or brakes are used or worn unnecessarily, and possibly also requires an additional intervention in the speed regulation that is unpleasant for the driver.

Patent document U.S. Pat. No. 7,260,465 B2 discusses a method for regulating the speed, in which a navigation system that comprises a positioning system such as GPS and map material is used to determine, by way of comparison to the position determined using GPS and on the basis of coordinates of off-ramps or exit ramps that are marked on the map, whether the vehicle is about to turn off onto such an exit ramp. If this is the case, and specifically before an adaptive cruise control unit had lowered the speed due to an obstacle, acceleration of the vehicle is prevented, even if the adaptive cruise control unit releases it again because the obstacle has disappeared due to a lane change so as to prevent unnecessary short-term acceleration.

Another disadvantage of this method is that it is based on stored map material, which may be incomplete or contain errors. In addition, the method relies on the use of GPS or other satellite positioning systems, which do not work, or work only to a limited extent, for example in tunnels.

SUMMARY OF THE INVENTION

It is an object of the present invention to provide a method and a control unit and a vehicle by which an unnecessary acceleration of the vehicle in the region before an exit ramp is reliably avoided.

The object may be achieved proceeding from a method in accordance with the preamble of claim 1 in connection with the characterizing features thereof. The subsequent dependent claims provide advantageous developments of the invention. A corresponding device and a corresponding vehicle are described herein.

The invention incorporates the technical teaching that an exit ramp is detected in a predicted travel path of the vehicle using the sensor system and the speed that is settable by the cruise control unit is limited to a value below the specified speed.

The speed is here able to be limited by way of limiting the acceleration. In particular if the speed should be kept constant, it is possible to completely suppress the acceleration. What is meant here is only the speed or acceleration that is able to be set by a driver assistance system, such as the cruise control unit. Direct regulation of the speed by the driver, i.e. operation for example of the gas or brake pedal, remains completely unaffected by this method.

In particular, one advantage of the method can be considered that of achieving a particularly high reliability due to the immediate sensor-based detection of the exit ramp in the predicted travel path. The predicted travel path is here typically calculated by a driver assistance system and in principle corresponds to the profile of the currently traveled lane. The detection of the exit ramp can be effected, depending on routing and signage, up to a distance of hundreds of meters in advance.

In accordance with an advantageous embodiment of the method, the speed that is able to be set by the cruise control unit is limited to the safety speed.

The advantage here is primarily that this limitation of the speed can be equated with a complete suppression of acceleration. This method can be technically realized particularly easily, and entirely avoids an unnecessary acceleration operation, which causes both additional fuel consumption and also an irregular driving experience that is subjectively considered as being unpleasant.

An exemplary embodiment of the invention makes provision for properties or parameters of the exit ramp to be detected using the sensor system and to be evaluated, and for a maximum speed to be calculated based on the parameters, and for the speed that is able to be set by the cruise control unit to be limited to this maximum speed.

The advantage of this particular embodiment is that it is possible to detect by way of sensor, that is for example using camera or radar, for example the width or the radius of curvature of the exit ramp based on geometric parameters and to calculate therefrom a maximum speed with which the vehicle can pass through the exit ramp without risk. This prevents in particular that the vehicle must be braked over the course of the exit ramp, which ultimately prevents ineffective fuel consumption and an avoidable wear of the brakes.

A very particular embodiment of the invention makes provision for a safety speed for maintaining a safe distance from an obstacle vehicle driving directly in front to be set by the cruise control unit, in the form of an adaptive cruise control unit, before the lane change.

This is therefore advantageous in particular because a situation that is particularly typical of long-distance traffic, in which a slower obstacle vehicle, such as for example a truck, is followed before a highway is left by way of an exit ramp, is optimized with respect to fuel consumption and wear.

One improvement of the invention provides for the limitation that is placed on the speed that is able to be set by the cruise control unit to be subsequently lifted as soon as a speed limitation that is independent thereof is lifted.

The advantage here primarily is in particular that this prevents unnecessary slowing of the vehicle if the exit ramp detected by the sensor system is for example part of an autobahn intersection, that is to say at the same time forms an entrance ramp to a different highway or flows into it. The independent speed limitation may be specified by way of a cornering speed limitation unit which is part of a driver assistance system. If the vehicle now drives from a first highway to a second highway by way of the curved exit ramp and the further curved entrance ramp, a cornering speed limitation unit which was active for example in the entrance ramp would be deactivated once the second highway is reached, as a result of which the speed limitation enforced by the cornering speed limitation unit is lifted. According to this embodiment of the invention, the speed limitation of the cruise control unit would then also be lifted, with the result that the driver does not need to intervene in the automatic speed regulation in order to accelerate again.

A further embodiment of the invention makes provision for the limitation on the speed that is able to be set by the cruise control unit to be lifted if a highway is detected along the travel path of the vehicle.

This method, which is able to be combined in particular with the previously mentioned improvement, has the advantage that the speed limitation is not unnecessarily maintained upon entry onto a highway. The detection of the highway can thus be effected, as the detection of the exit ramp, by way of the sensor system, i.e. for example by way of camera and digital image recognition, or by way of a navigation system, for example using GPS.

A particular embodiment of the invention makes provision for the exit ramp to be detected by way of a sensor system in the form of at least one camera or stereocamera.

Such a camera, which can also be used for example for detecting lane changes, permits particularly reliable detection both of properties of the road and of lane markings and road limits, and of signage that indicates an exit ramp. As a result, it is possible to detect an exit ramp or off ramp as early as several hundred meters before a curve located therein is reached or detect speed limit signage which would make regulation of speed mandatory.

The invention is further improved by the fact that the exit ramp is detected using an additional sensor system in the form of a radar or a lidar unit by way of sensor fusion.

The advantage here is in particular that the accuracy and also the reliability of the detection are significantly increased over purely visual detection by way of camera. Radar or lidar units provide three-dimensional information that can only be estimated by analysis of an image obtained with a single camera, i.e. a single lens. A stereocamera may likewise provide three-dimensional information, but the accuracy of the detection of this information can also be improved further by way of combined evaluation with a radar or lidar unit.

Further measures that improve the invention are illustrated in more detail below, together with the description of an exemplary embodiment of the invention, on the basis of the four figures.

DETAILED DESCRIPTION

Figure 1:
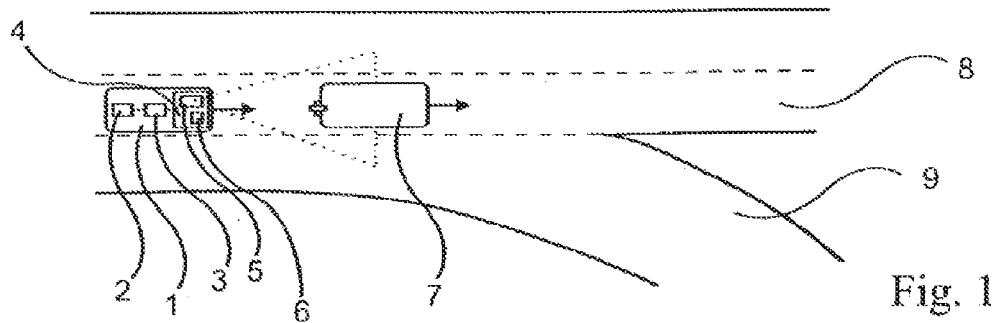
FIG. 1 shows a schematic illustration of a region in front of an autobahn exit ramp with a vehicle having an activated adaptive cruise control unit.

According to FIG. 1, a vehicle 1 has a cruise control unit 2 for setting the speed. The cruise control unit 2 here communicates, via a control unit 3, with a sensor system 4, which comprises a radar unit 5 and a camera 6 which are directed along the travel direction. The camera 6 here images electromagnetic radiation from the optical spectrum, while the radar unit 5 emits and records radiation in the millimeter wavelength range.

The vehicle 1 follows an obstacle vehicle 7 at a safety distance that is maintained by the cruise control unit 2, in the form of an adaptive cruise control unit, by setting a safety speed. The distance from the obstacle vehicle 7 is here measured by way of the sensor system 4 in the form of the radar unit 5.

A data point that is relevant for the measurement and is formed for example by scattering or reflection is here symbolized by way of example by a plus sign. The cone that delimits the field of view of the sensor system 4 is illustrated schematically by way of a dotted triangle.

Figure 2:
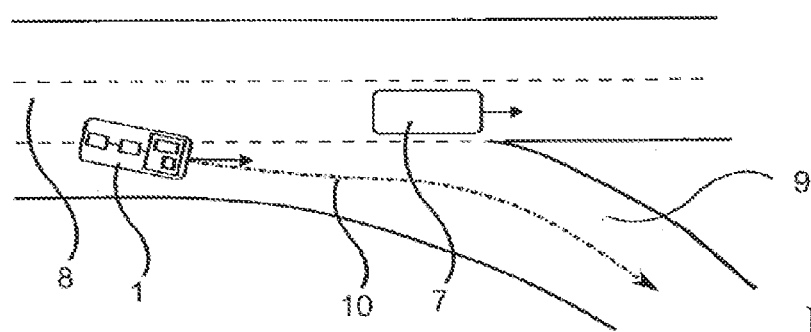
FIG. 2 shows a schematic illustration of the lane change and of the projected travel path of the vehicle.

FIG. 2 shows the lane change of the vehicle 1, which changes from the highway 8 to an exit ramp 9. As a result, in particular the obstacle vehicle 7 is no longer followed. In other words, the obstacle vehicle disappears as an obstacle.

The control unit 3 here calculates the predicted travel path 10 of the vehicle, which leads onto the exit ramp 9.

Figure 3:
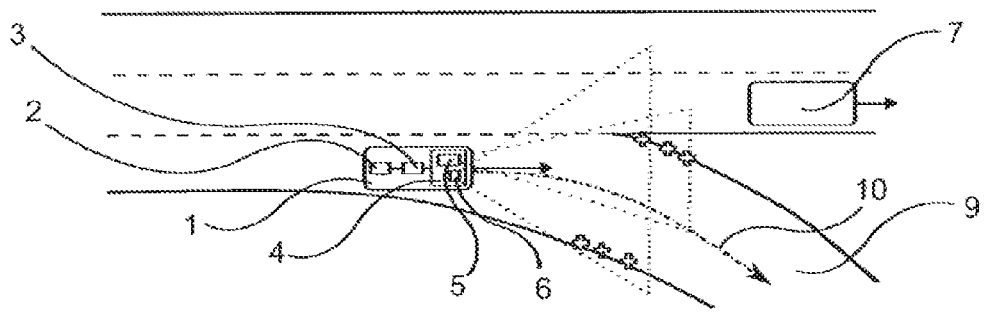
FIG. 3 shows a schematic illustration of the detection of the exit ramp by way of sensor fusion.

According to FIG. 3, the vehicle 1 is situated on a lane that leads onto the exit ramp 9. The exit ramp 9 is here detected at a distance by way of the sensor system 4. For detection, sensor fusion is used here, wherein the measurement points of the camera 6 and of the radar unit 5 that are marked graphically by way of plus signs are compared.

The information that an exit ramp is situated within the predicted travel path 10 is evaluated by the control unit 3, which communicates with the sensor system 4, and transmitted to the cruise control unit 2. The latter is then prevented from accelerating the vehicle 1, even though the obstacle vehicle 7 no longer represents an obstacle. The vehicle 1 consequently drives at a constant speed over the exit ramp 9 and in particular does not need to be braked by the driver.

Figure 4:
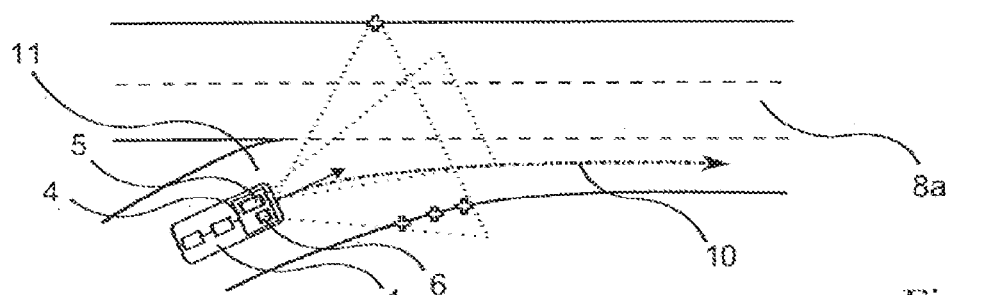
FIG. 4 shows a schematic illustration of the detection of the re-entry onto a linking highway using sensor fusion.

According to FIG. 4, the vehicle 1 immediately afterwards turns from an entrance ramp 11, which links to the exit ramp 9 which is not illustrated here any further, onto a highway 8a. The highway 8a is detected as such by sensor fusion of camera 6 and radar unit 5, and as a result the previously activated speed limitation is deactivated again such that the cruise control unit 2 can accelerate the vehicle 1 to the specified speed.

The present invention is not limited to the previously described exemplary embodiments. Rather, modifications are also feasible that are encompassed by the scope of protection of the following claims. It is thus also possible for example to use a lidar unit instead of a radar unit or a stereocamera instead of a camera. The figures should also be understood merely to be diagrams. In particular, the actual distances, for example between the vehicle and the exit ramp upon detection thereof, can be far greater.

THE LIST OF REFERENCE SIGNS IS AS FOLLOWS

1 vehicle
2 cruise control unit
3 control unit
4 sensor system
5 radar unit
6 camera
7 obstacle vehicle
8, 8a highway
9 exit ramp
10 travel path
11 entrance ramp

The invention claimed is:

1. A method for regulating a speed of a vehicle, in which a cruise control unit is provided to set a speed and a sensor system, which is directed in a direction of travel, is provided to detect an environment by spatially resolving electromagnetic radiation, the method comprising:
   defining, via a device for regulating the speed of the vehicle, a specified speed;
   setting, via the device, a safety speed that is reduced with respect to the specified speed by the cruise control unit;
   detecting, via the device, a lane change of the vehicle by the sensor system;
   detecting, via the device, an exit ramp within a predicted travel path of the vehicle using the sensor system; and
   limiting, via the device, the speed that is settable by the cruise control unit to a value below the specified speed;
   wherein the device is configured to operate under both of functions (i) and (ii) as follows:
      (i) for a lane change from a main roadway to the exit ramp, following a condition in which the vehicle had been following an obstacle vehicle at a safety distance that is maintained by the control unit, which includes an adaptive cruise control unit, by setting a safety speed, so that the obstacle vehicle is no longer followed, the control unit determines a predicted travel path of the vehicle which leads from the highway onto the exit ramp, and information that the exit ramp is situated within a predicted travel path is evaluated by the control unit, which communicates with the sensor system, so that the control unit operates to prevent acceleration of the vehicle, even though the obstacle vehicle no longer represents an obstacle, so that the vehicle drives at a constant speed over the exit ramp and need not be braked by the driver; and
      (ii) for traveling from an entrance ramp onto a main roadway, which links to the exit ramp, the main roadway is detected by the sensor system, a previously activated speed limitation is deactivated such that the control unit can accelerate the vehicle to a specified speed of the main roadway.

2. The method of claim 1, wherein the speed that is settable by the cruise control unit is limited to the safety speed.

3. The method of claim 1, wherein geometric properties of the exit ramp are detected using the sensor system and evaluated to the effect that a maximum speed is calculated therefrom and the speed that is settable by the cruise control unit is limited to this maximum speed.

4. The method of claim 1, wherein the safety speed for maintaining a safe distance from an obstacle vehicle driving directly in front is set by the cruise control unit, in the form of an adaptive cruise control unit, before the lane change.

5. The method of claim 1, wherein subsequently the limitation on the speed that is settable by the cruise control unit is lifted as soon as a speed limit that is independent thereof is lifted.

6. The method of claim 1, wherein subsequently the limitation on the speed that is settable by the cruise control unit is lifted if a highway is detected along the travel path of the vehicle.

7. The method of claim 1, wherein the exit ramp is detected with the aid of a camera.

8. The method of claim 7, wherein the exit ramp is detected by radar-based sensor fusion or lidar-based sensor fusion.

9. A device for regulating the speed of a vehicle, comprising:
   a control unit configured to regulate a speed of a vehicle, in which a cruise control unit is provided to set a speed and a sensor system, which is directed in a direction of travel, is provided to detect an environment by spatially resolving electromagnetic radiation, by performing the following:
      defining a specified speed;
      setting a safety speed that is reduced with respect to the specified speed by the cruise control unit;
      detecting a lane change of the vehicle by the sensor system;
      detecting an exit ramp within a predicted travel path of the vehicle using the sensor system; and
      limiting the speed that is settable by the cruise control unit to a value below the specified speed;
   wherein the device is configured to operate under both of functions (i) and (ii) as follows:
      (i) for a lane change from a main roadway to the exit ramp, following a condition in which the vehicle had been following an obstacle vehicle at a safety distance that is maintained by the control unit, which includes an adaptive cruise control unit, by setting a safety speed, so that the obstacle vehicle is no longer followed, the control unit determines a predicted travel path of the vehicle which leads from the highway onto the exit ramp, and information that the exit ramp is situated within a predicted travel path is evaluated by the control unit, which communicates with the sensor system, so that the control unit operates to prevent acceleration of the vehicle, even though the obstacle vehicle no longer represents an obstacle, so that the vehicle drives at a constant speed over the exit ramp and need not be braked by the driver; and
      (ii) for traveling from an entrance ramp onto a main roadway, which links to the exit ramp, the main roadway is detected by the sensor system, a previously activated speed limitation is deactivated such that the control unit can accelerate the vehicle to a specified speed of the main roadway.

10. The device of claim 9, wherein the sensor system includes, for detecting the exit ramp, at least one camera which receives image signals from the control unit.

11. The device of claim 9, wherein the sensor system includes, for detecting the exit ramp, at least one of a radar unit or a lidar unit which receives signals from the control unit.

12. A vehicle, comprising:
a device for regulating the speed of a vehicle, including a control unit configured to regulate a speed of a vehicle, in which a cruise control unit is provided to set a speed and a sensor system, which is directed in a direction of travel, is provided to detect an environment by spatially resolving electromagnetic radiation, by performing the following:
  defining a specified speed;
  setting a safety speed that is reduced with respect to the specified speed by the cruise control unit;
  detecting a lane change of the vehicle by the sensor system;
  detecting an exit ramp within a predicted travel path of the vehicle using the sensor system; and
  limiting the speed that is settable by the cruise control unit to a value below the specified speed;
wherein the device is configured to operate under both of functions (i) and (ii) as follows:
  (i) for a lane change from a main roadway to the exit ramp, following a condition in which the vehicle had been following an obstacle vehicle at a safety distance that is maintained by the control unit, which includes an adaptive cruise control unit, by setting a safety speed, so that the obstacle vehicle is no longer followed, the control unit determines a predicted travel path of the vehicle which leads from the highway onto the exit ramp, and information that the exit ramp is situated within a predicted travel path is evaluated by the control unit, which communicates with the sensor system, so that the control unit operates to prevent acceleration of the vehicle, even though the obstacle vehicle no longer represents an obstacle, so that the vehicle drives at a constant speed over the exit ramp and need not be braked by the driver; and
  (ii) for traveling from an entrance ramp onto a main roadway, which links to the exit ramp, the main roadway is detected by the sensor system, a previously activated speed limitation is deactivated such that the control unit can accelerate the vehicle to a specified speed of the main roadway.

* * * * *